United States Patent [19]

Beretta

[11] Patent Number: 5,290,130
[45] Date of Patent: Mar. 1, 1994

[54] MACHINE TOOL AND METHOD OF COOLING ROTARY PARTS THEREOF

[75] Inventor: Giovanni Beretta, Milan, Italy

[73] Assignee: San Rocco Donzelli Industriale S.p.A., Solaro, Italy

[21] Appl. No.: 937,359

[22] Filed: Aug. 27, 1992

[51] Int. Cl.$^5$ .......................................... B23Q 11/12
[52] U.S. Cl. .............................. 409/131; 409/135; 409/231
[58] Field of Search ........... 409/131, 135, 231, 233, 409/136, 232

[56] References Cited

U.S. PATENT DOCUMENTS

| | | | |
|---|---|---|---|
| 2,343,875 | 3/1944 | Schwartz | 409/135 |
| 2,377,271 | 5/1945 | Schumann | 409/135 |
| 2,387,412 | 10/1945 | Schnable | 409/135 |
| 2,995,069 | 8/1961 | Mahlstrom | 409/233 |
| 4,580,471 | 4/1986 | Oyama et al. | 409/135 |

FOREIGN PATENT DOCUMENTS

| | | | |
|---|---|---|---|
| 415138 | 3/1991 | European Pat. Off. | 409/135 |
| 2438 | 1/1992 | Japan | 409/135 |

Primary Examiner—Daniel W. Howell
Attorney, Agent, or Firm—Darby & Darby

[57] ABSTRACT

The spindle and the bearings for the spindle in a milling, boring or other machine are cooled by streams of air which is drawn from the surrounding atmosphere by one or more turbine wheels. The turbine wheel or wheels are rotated by the spindle or by a pulley which drives the spindle, and the air streams are caused to withdraw heat from one or more tubes which are adjacent and/or surround the bearings for the spindle. The feature that the turbine wheel or wheels are driven at a speed which is proportional to the RPM of the spindle ensures that the cooling action is also proportional to such speed.

20 Claims, 5 Drawing Sheets

MACHINE TOOL AND METHOD OF COOLING ROTARY PARTS THEREOF

BACKGROUND OF THE INVENTION

The invention relates to a method of cooling rotary spindles and/or other sensitive parts of machines, e.g., to a method of cooling the spindle and the antifriction bearing or bearings in a milling machine, a boring or drilling machine or another machine tool. The invention also relates to improvements in machines wherein the spindles and/or other parts are cooled in accordance with the novel method.

Adequate cooling of rotary parts of certain recent types of machines, for example, adequate cooling of spindles and antifriction bearings in modern milling or boring machines and/or certain other machine tools, presents numerous problems. Accumulation of substantial quantities of heat in the column or head of a machine wherein the spindle and its bearings are mounted in the head can result in undesirable thermally induced expansion of the spindle with attendant reduction of the accuracy of finish of the workpieces. Moreover, overheating of the spindle and of its bearings can affect the ability of the machine to repeatedly treat workpieces, including shorter or longer series of successively treated workpieces, with the same degree of accuracy and reproducibility.

In many conventional machines wherein the spindle is driven by an electric motor through one or more gear transmissions or other types of transmissions, the head or column of the machine as well as the spindle and its bearings are cooled by oil or another lubricant which is used to lubricate the bearing or bearings and the transmission or transmissions as well as to withdraw heat from the column and from the spindle. The withdrawal of heat from the column and from the spindle is effected by a heat exchanger which causes the confined supply of oil to exchange heat with air or with another coolant, such as Freon (trademark). The heat exchanger contributes to the bulk and complexity as well as to the initial and maintenance cost of the cooling system and of the entire machine. Moreover, cooling systems which employ oil and means for effecting an exchange of heat between oil and air or another fluid coolant are satisfactory only when the rotational speed of the spindle does not exceed a relatively low value, such as approximately 3000 RPM.

Certain recent types of machines employ spindles which receive torque directly from high-speed electric motors capable of rotating the spindles at speeds of up to and even in excess of 4000 RPM. Such motors are often equipped with electronically operated speed regulating means which can rapidly accelerate the rotor of the motor and the spindle of a machine to a speed of at least 4000 RPM. The establishment of direct connection between the output element of a motor and the spindle of a milling, boring or other machine renders it possible to dispense with the gear transmission(s) and/or with other types of transmissions which are used in heretofore known machines to transmit torque from the motor to the spindle. This, in turn, renders it possible to dispense with means for lubricating and cooling the transmission or transmissions. Thus, if such machines continue to employ supplies of lubricant, the lubricant is used solely to perform a cooling action. It was believed that such cooling and lubricating means cannot be omitted because a relatively long spindle which is mounted in several antifriction bearings to rotate in the housing of a machine tool at speeds of up to 4000 RPM invariably causes the development of localized overheating, especially in the regions of the antifriction bearings. The bearings are likely to be overheated even if they contain encapsulated supplies of grease or another lubricant, i.e., even if the bearings are of the type requiring no outside lubrication in actual use. It has been found that bearings which contain encapsulated supplies of grease or another lubricant are still likely to be overheated in a machine wherein they are called upon to surround portions of a spindle or an analogous rotary part which is driven at speeds of up to and even in excess of 4000 RPM. Thus, it is necessary to adequately cool the spindle and the bearings in a machine wherein the bearings contain encapsulated supplies of grease or another lubricant and the spindle receives torque directly from a motor, i.e., without the interposition of one or more transmissions which employ gears and require continuous or frequent lubrication. If the cooling is effected by resorting to a liquid, a supply of such liquid must be confined in and circulated within the housing for the sole purpose of preventing overheating of the housing, bearings and spindle, i.e., such liquid need no longer perform any lubricating action. The installation of liquid-containing cooling systems in a machine tool or in another machine contributes excessively to the bulk and complexity as well as to the initial and maintenance cost of such machines.

OBJECTS OF THE INVENTION

An object of the invention is to provide a novel and improved method of cooling the spindle or an analogous rotary part as well as the bearing or bearings for the spindle in a milling, boring or other machine in a novel and improved way so that the cooling action can be carried out without resorting to a supply of liquid coolant.

Another object of the invention is to provide a novel and improved air cooled milling, boring or other machine wherein the spindle is rotatable at speeds of up to at least 4000 RPM.

A further object of the invention is to provide a novel and improved method of cooling the spindle and certain other sensitive parts of a machine with atmospheric air.

An additional object of the invention is to provide a method of cooling the spindle and the bearings in a machine tool in such a way that the cooling system does not necessitate the provision of a discrete prime mover for circulation of a fluid coolant.

Still another object of the invention is to provide a machine wherein the spindle and its bearing or bearings are cooled in a novel and improved way.

A further object of the invention is to provide a spindle cooling system which can be installed in existing machines as a superior substitute for conventional cooling systems.

Another object of the invention is to provide a novel and improved housing for the spindle and the bearings of a milling, boring or other machine wherein the spindle can be rotated at speeds of up to at least 4000 RPM.

Still another object of the invention is to provide a novel and improved system of air circulating devices for use in the above outlined machine.

A further object of the invention is to provide novel and improved means for rotating the spindle in a machine tool and for simultaneously contributing to withdrawal of heat from such spindle and its bearings.

An additional object of the invention is to provide a novel and improved system for simultaneously cooling the housing for the spindle, the spindle and certain other parts in a machine wherein the spindle is rotatable at speeds of up to and in excess of 4000 RPM and wherein the spindle receives or can receive torque directly from an electric motor or another suitable prime mover, i.e., without the interposition of one or more transmissions which require lubrication when in actual use.

SUMMARY OF THE INVENTION

One feature of the present invention resides in the provision of a method of cooling a spindle which is rotatable in at least one bearing in a housing of a machine (e.g., in the column of a milling machine). The improved method comprises the steps of rotating the spindle at a plurality of speeds, inducing the flow of at least one cooling air stream, causing the at least one air stream to exchange heat with the spindle and with the at least one bearing, and varying the quantity of air in the at least one stream as a function of variations of the speed of the spindle. The flow inducing step preferably includes drawing air from the surrounding atmosphere. In accordance with a presently preferred embodiment of the method, such flow inducing step includes connecting the spindle with at least one rotary turbine wheel which draws air from the surrounding atmosphere. The varying step of such method can comprise coupling the at least one turbine with the spindle so that the speed of rotation of the turbine is proportional to the speed of the spindle.

The step of causing the at least one air stream to exchange heat with the spindle and with the at least one bearing can comprise conveying the at least one air stream from the atmosphere and along the spindle in at least one of two directions including a first direction substantially radially and a second direction substantially axially of the spindle.

Another feature of the invention resides in the provision of a machine, such as a machine tool, which comprises a housing (such housing can include or constitute the column or head of a milling machine), a horizontal, vertical or otherwise inclined rotary member (hereinafter called spindle) which is rotatable in the housing, friction reducing means including at least one bearing which is installed between the housing and the spindle, means for rotating the spindle at a plurality of different speeds, and novel and improved means for cooling the spindle and the at least one bearing. The cooling means includes means for drawing at least one stream of air from the surrounding atmosphere at a rate which is at least substantially proportional to the speed of the spindle, and means for establishing an exchange of heat between the at least one air stream on the one hand, and the spindle and the at least one bearing on the other hand.

The drawing means can comprise at least one air compressing turbine wheel having at least one intake for atmospheric air and at least one outlet for admission of compressed air to the means for establishing an exchange of heat. Such means for establishing an exchange of heat can define at least one channel for the at least one air stream. Such channel has an air receiving end in communication with the at least one outlet of the at least one turbine wheel and a second end which discharges spent air into the atmosphere.

The means for establishing an exchange of heat can comprise a tubular member which is installed in the housing and surrounds the spindle and the at least one bearing. The at least one channel can be disposed between the tubular member and the housing, i.e., the housing can be said to form part of the means for establishing an exchange of heat between the stream or streams of atmospheric air on the one hand and the spindle and at least one bearing on the other hand.

The means for rotating the spindle can comprise a pulley (e.g., a toothed pulley) having at least one passage (e.g., a bore or hole which extends through the pulley in parallelism with the axis of rotation of the spindle) serving to connect the means for drawing at least one air stream with the atmosphere. As mentioned above, such drawing means can comprise at least one rotary air compressing turbine wheel having an intake in communication with the at least one passage in the pulley and at least one outlet for compressed air. The means for establishing the exchange of heat defines the aforementioned channel or channels each having a receiving end in communication with the at least one outlet and a second end which discharges spent (heated) air into the atmosphere.

The means for drawing at least one air stream can include a substantially bell-shaped turbine wheel which receives torque from the rotating means (e.g., by way of the spindle). Such turbine wheel has a suction intake for atmospheric air, an outlet for compressed air and air compressing and conveying vanes or blades between the intake and the outlet.

As already mentioned hereinabove, the means for establishing an exchange of heat between the at least one air stream and the spindle and the bearing or bearings can comprise a tubular member which is installed in the housing and surrounds the spindle. The tubular member and the housing define a chamber for reception of the at least one air stream from at least one rotary turbine wheel of the means for establishing the flow of at least one air stream. The tubular member can be provided with heat dissipating projections (e.g., ribs extending in parallelism with the axis of the spindle) in the chamber. Such projections can be used to divide the chamber into a plurality of channels which receive compressed air from the outlet of the at least one turbine wheel.

The at least one turbine wheel, or one of a plurality of turbine wheels, can comprise a substantially axially extending annular intake which draws air from the surrounding atmosphere in response to rotation of the spindle, and a plurality of substantially radially outwardly extending outlets which discharge air from the intake into the atmosphere. Such turbine wheel includes a portion (e.g., a hub which is affixed to and is rotated by the spindle) which forms part of the means for establishing an exchange of heat between the spindle and the bearing or bearings on the one hand, and the air stream or streams on the other hand. The just discussed turbine wheel can be disposed at one axial end of the spindle, preferably at that end which is remote from the pulley of the means for rotating the spindle.

If the spindle is elongated, the friction reducing means can comprise a plurality of antifriction bearings which are spaced apart from each other in the longitudinal (axial) direction of such elongated spindle. The means for drawing air from the atmosphere then preferably comprises a plurality of air compressing and/or conveying turbine wheels at least one of which is adjacent to one of the bearings and has an intake for atmospheric air and an outlet for compressed air. At least one of the turbine wheels receives or can receive torque from the means for rotating the spindle, particularly directly from the spindle.

The means for rotating the spindle can include a variable speed electric motor which can drive the spindle at speeds in the range of up to and even in excess of 4000 RPM.

The novel features which are considered as characteristic of the invention are set forth in particular in the appended claims. The improved machine itself, however, both as to its construction and its mode of operation, together with additional features and advantages thereof, will be best understood upon perusal of the following detailed description of certain presently preferred specific embodiments with reference to the accompanying drawings.

DESCRIPTION OF PREFERRED EMBODIMENTS

Figure 1:
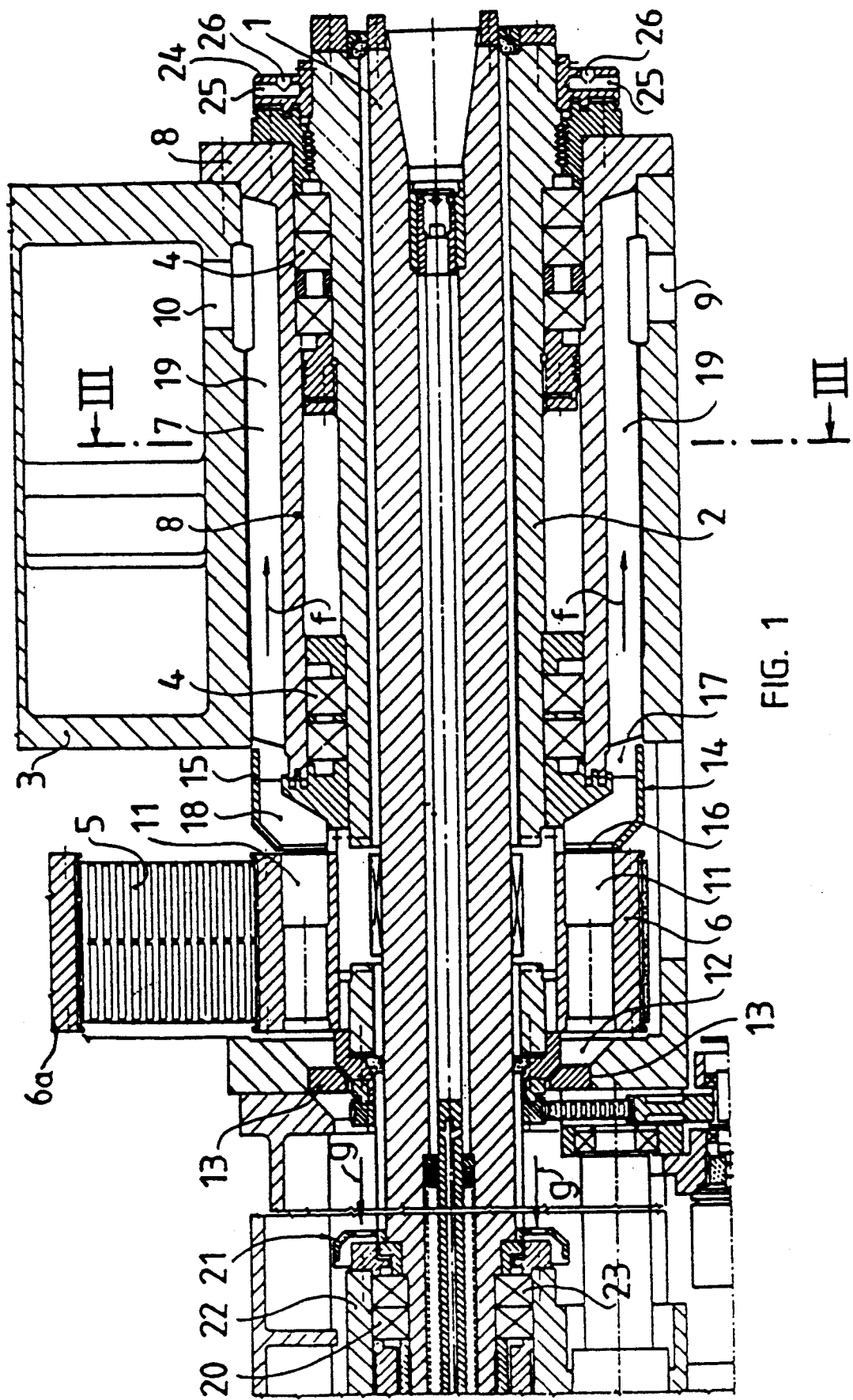
FIG. 1 is a schematic fragmentary vertical sectional view of a milling machine which embodies the invention, the section being taken axially of the spindle which is installed in the column of a universal or plain milling machine.

FIG. 1 shows a portion of a machine (e.g., a milling, boring or drilling machine or another machine tool) wherein a spindle 1 is rotatable about a horizontal axis with a sleeve 2 which, in turn, is rotatable in a tubular member 8 installed in the housing of the machine. FIG. 1 shows a portion 3 of the housing; such portion can constitute the head or column of a grinding machine. The spindle 1 is axially movable in the sleeve 2 and the latter is rotatable in two sets of antifriction bearings 4 (e.g., ball bearings) which are installed in the tubular member 8 (hereinafter called tube for short).

The means for rotating the spindle 1 at a plurality of speeds includes an electric motor (not shown) having an output element which transmits torque to the spindle through the medium of an endless toothed belt 5. The latter is trained over a first toothed pulley 6a on the output element of the motor and over a second toothed pulley 6 which is coaxial with and is keyed or otherwise non-rotatably connected to an intermediate portion of the spindle 1 to the left of the sleeve 2.

The tubular member 8 and the surrounding portion or head 3 of the machine housing define an annular chamber 7 which is subdivided into a plurality of axially parallel passages or channels by a set of radially outwardly extending heat dissipating projections or ribs 19 at the exterior of the tube. Each channel of the chamber 7 has a first end serving to receive compressed air from the outlet or outlets 17 of a turbine wheel 14 which is rotated by the pulley 6 and/or by the spindle 1 in the region between the pulley 6 and the tube 8. Each channel of the chamber 7 extends at least substantially all the way from the pulley 6 to the front (right-hand) end of the tube 8 (as viewed in FIG. 1). The chamber 7 has a second end which discharges spent (heated) air into the openings 9 and 10 of the head 3; these openings communicate with the surrounding atmosphere.

Figure 2:
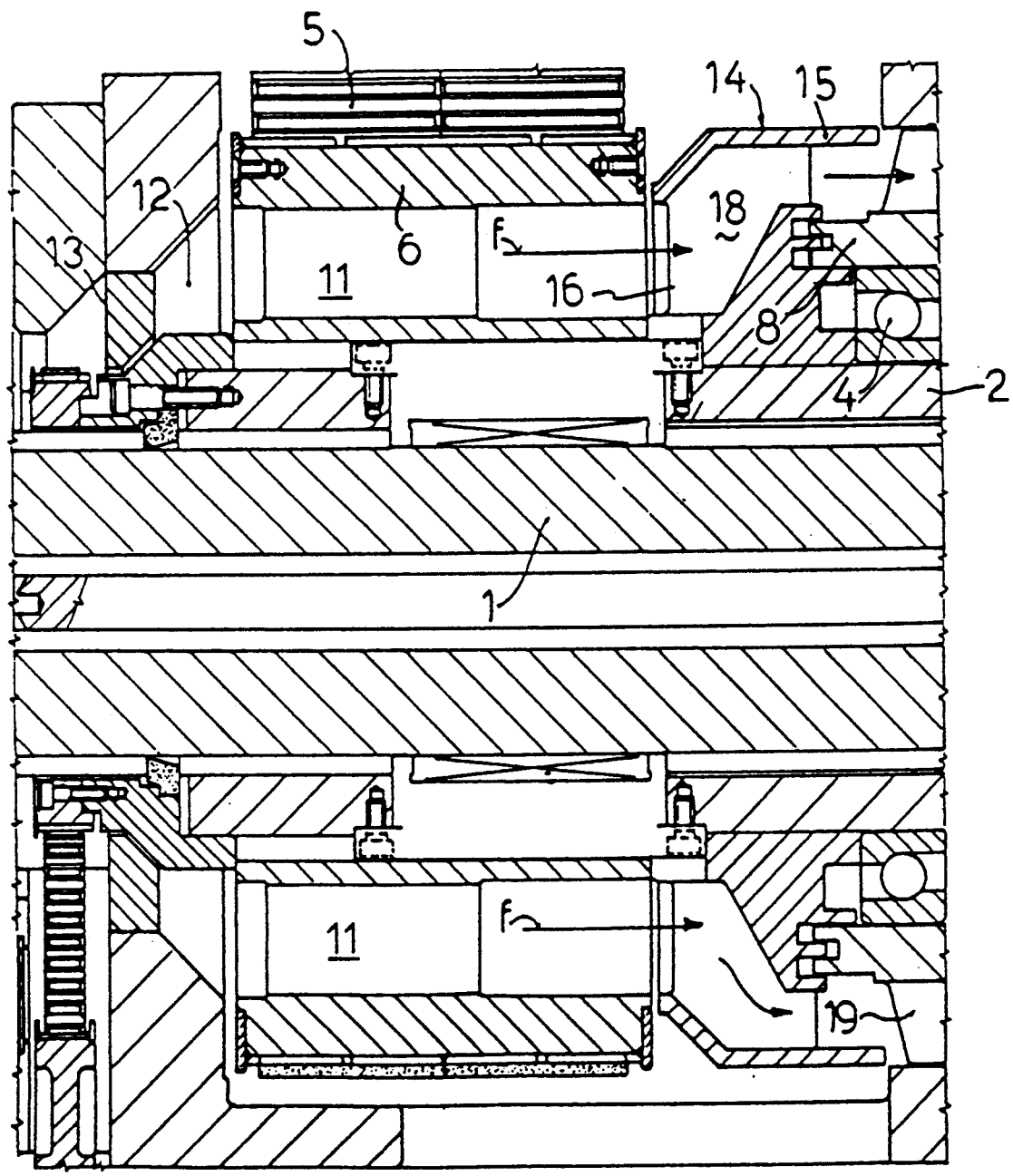
FIG. 2 is an enlarged view of a detail in the structure of FIG. 2, showing the construction and mounting of a bell-shaped turbine wheel which is installed between a pulley of the means for rotating the spindle and a tubular member which surrounds the spindle and certain of its bearings.
Figure 3:
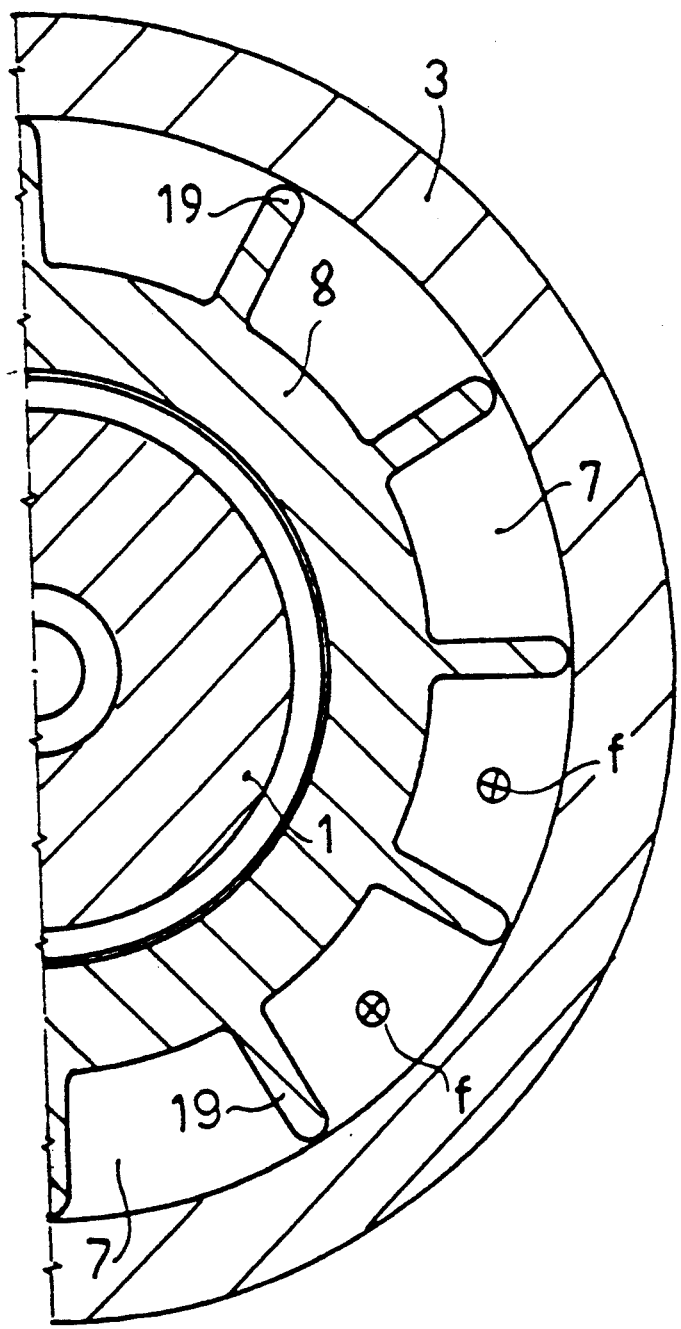
FIG. 3 is a fragmentary transverse sectional view substantially as seen in the direction of arrows from the line III—III in FIG. 1.

The pulley 6 is provided with axially parallel passages 11 which extend all the way between its two end faces. The left-hand end of each passage 11 serves to draw air from the surrounding atmosphere, and the right-hand end of each of these passages serves to admit atmospheric air into an annular intake 16 of the turbine wheel 14. The latter has a substantially cup-shaped or bell-shaped body portion 17 surrounded by an annulus of vanes or blades 18 which are designed to compress atmospheric air and to deliver compressed air to the adjacent ends of the channels of the chamber 7 through the outlet 17. The passages which contain the vanes 18 draw atmospheric air through the axially parallel passages 11 of the pulley 6 when the latter is driven by the electric motor to rotate the spindle 1 and the sleeve 2. The passages 11 can constitute bores or holes which are drilled into the body of the pulley 6 and extend in substantial parallelism with the common axis of the pulley 6 and spindle 1. Each passage 11 communicates with at least one hole or bore 12 provided in the housing of the machine and serving to supply atmospheric air to the passages 11 and thence to the intake or intakes 16 of the turbine wheel 14. A ring-shaped filter 13 can be installed upstream of the holes or bores 12 in the housing of the machine to intercept dust, shavings and/or other impurities which are contained in streamlets of air flowing toward and into the turbine wheel 14. The dimensions of the outlets 17 of the turbine wheel 14 preferably match the dimensions of the adjacent ends of channels forming part of the chamber 7 between the tube 8 and the head 3. The directions of flow of compressed air through the channels of the chamber 7 are indicated by arrows f (see also FIGS. 2 and 3). The turbine wheel 14 forms part of means for drawing streams of cool or relatively cool air from the surrounding atmosphere, and the tube 8 and the adjacent portion of the head 3 form part of means for establishing an exchange of heat between such air streams on the one hand and spindle 1 and bearings 4 on the other hand.

Figure 4:
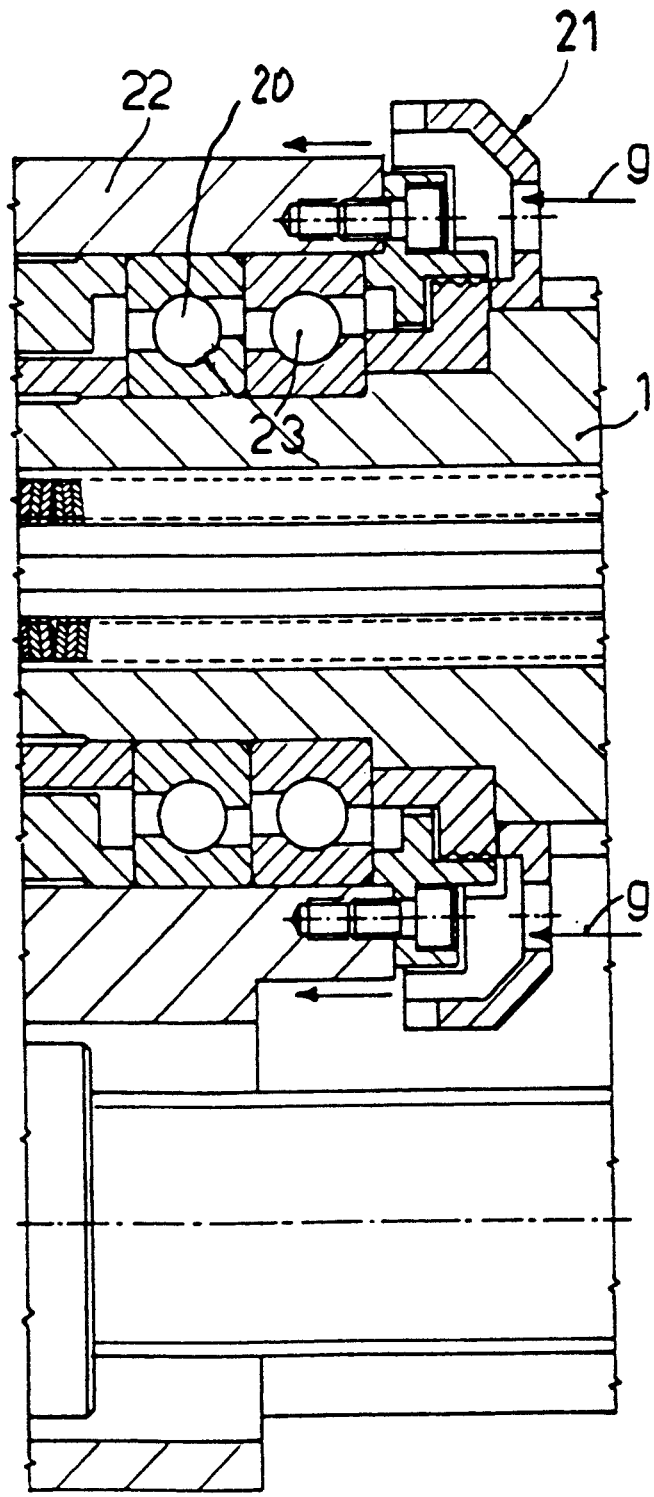
FIG. 4 is an enlarged view of another detail in the structure of FIG. 1, showing the construction of a turbine wheel at the rear end of the spindle.

FIGS. 1 and 4 further show antifriction bearings (e.g., ball bearings) 20 and 23 which surround the spindle 1 behind the filter 13 and pulley 6 and are cooled by air streams flowing in directions indicated by arrows g. Such air streams are drawn from the surrounding atmosphere by a turbine wheel 21 which receives torque from the pulley 6 through the spindle 1 and directs streams of compressed air against a tubular member 22 which surrounds the bearings 20 and 23. The streams of compressed air flow along the external surface of the tubular member 22 which exchanges heat with the bearings 20, 23 when the turbine 21 is driven by the spindle 1.

Figure 5:
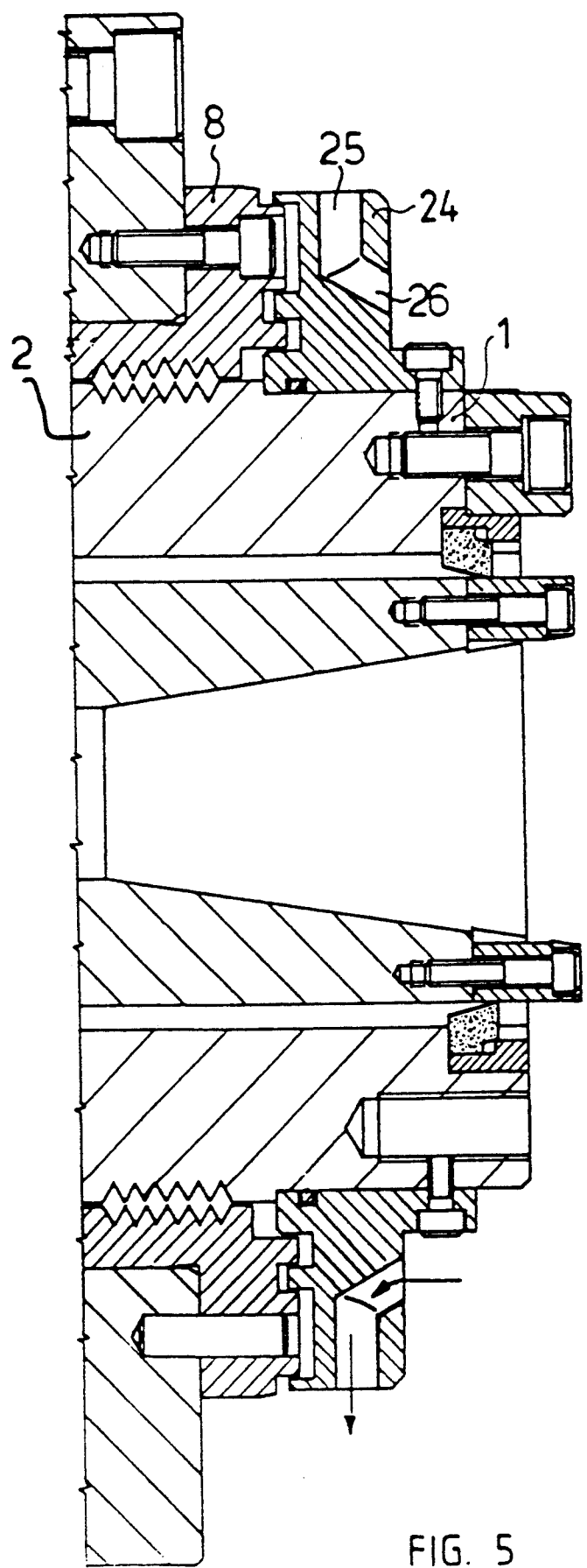
FIG. 5 is an enlarged view of a further detail in the structure of FIG. 1, showing another turbine wheel which is mounted on the front end of the spindle.

A further turbine wheel 24 is mounted on the front end of the spindle 1, and more specifically on the sleeve 2 in front of the tube 8. The turbine wheel 24 has an annular intake 26 which draws air in the axial direction of the spindle 1 when the latter is rotated by the pulley 6, and rotation of the turbine wheel 24 causes the flow of air entering via inlet 26 to leave this turbine wheel under the action of centrifugal force by flowing through radially extending outlets 25. The radially inner and left-hand portions of the turbine wheel 24 (as seen in FIGS. 1 and 5) cool the adjacent portions of the sleeve 2, spindle 1 and tube 8. Streams of air which leave the turbine wheel 24 by flowing radially outwardly through the outlets 25 establish in the interior of this turbine wheel a pressure which is below atmospheric pressure so that the intake 26 draws atmospheric air toward and into the outlets 25 when the spindle 1 is rotated by the pulley 6. The provision of the just discussed turbine wheel 24 at the front end of the spindle 1 exhibits the advantage that the spindle is adequately cooled in the region which is located in front of the channel 7, i.e., which cannot always be adequately cooled by streams of air flowing in the directions indicated by arrows f.

The heat dissipating projections or ribs 19 constitute an optional but desirable feature of the improved cooling system. These projections greatly enlarge the external surface of the tube 8 and thus enable the streams of air flowing in the directions indicated by arrows f to withdraw larger quantities of heat before they reenter the atmosphere by flowing through the openings 9 and 10 in the head 3. It is clear that at least some of the projections 19 can be replaced by or that such projections can be used jointly with otherwise configurated projections, e.g., with projections extending helically around the tube 8.

The mode of operation of the improved cooling system is as follows:

The motor which forms part of the means for rotating the spindle 1 is or can be designed to rotate the pulley 6 at a speed of between 0 and 4000 RPM. Thus, the power train between the motor and the spindle 1 need not employ one or more gear transmissions and/or other parts which require careful cooling when the machine (e.g., a milling machine) is in actual use. This entails considerable savings in space as well as in initial cost and maintenance cost because the head 3 and/or any other part of the housing of the machine need not be provided with a sump for a supply of liquid coolant and/or with means for circulating such coolant in order to cool the transmission or transmissions and/or the spindle 1 and/or the bearings 4, 4, 20 and 23. The bearings 4, 4, 20 and/or 23 can be of the type wherein the inner and outer races cooperate with sealing devices (not shown) to permanently confine supplies of grease or another suitable lubricant for the rolling elements (e.g., needles, balls or rollers) between the inner and outer races. Furthermore, it is not necessary to maintain a supply of inert and/or other gaseous coolant in order to ensure adequate cooling of the spindle 1, sleeve 2, bearings 4, 4, 20, 23 and head 3 including the tubes 8 and 22. All that is necessary is to draw adequate quantities of atmospheric air by resorting to one or more turbine wheels or other suitable air drawing means. Such turbine or turbines need not be driven by a separate prime mover because they can receive torque from the motor through the pulley 6 and/or spindle 1. This not only entails substantial savings in space as well as initial and maintenance cost but also ensures that the quantity of atmospheric air which is used to withdraw heat from the spindle 1, sleeve 2, tube 8, head 3 and bearings 4, 4, 20, 23 is invariably proportional to the RPM of the spindle. Thus, the quantity of air which is drawn by the turbine wheels 14, 21 and 24 increases or decreases with increasing or decreasing rotational speed of the spindle 1. This is desirable for the following reasons: The quantity of air which is available to cool the spindle 1 and/or other heat generating and/or heat storing parts of the machine increases in response to increasing speed of the spindle, i.e., in response to increasing likelihood of overheating the spindle, the bearings and/or other rotary as well as stationary parts of the machine. In addition, the cooling system can regulate the quantity of cooling air by automatically considering the fluctuations of temperature of atmospheric air, i.e., by taking into consideration that, in the absence of air conditioning in the plant in which the machine employing the improved cooling system is put to use, the temperature of atmospheric air is higher during the summer than during the winter. The temperature of streams of atmospheric air which is used to cool the spindle 1 and other parts of the machine is dependent on the difference between the temperature of the machine and the temperature of atmospheric air. This contributes to more satisfactory cooling of the machine and such proper cooling action is effected in a fully automatic way.

The air drawing action of the turbines 14, 21 and 24 increases proportionally with the rotational speed of the spindle 1, i.e., proportionally with the need for a more pronounced cooling of the spindle 1, sleeve 2, bearings 4, 4, 20, 23 and certain other parts. Thus, if the motor drives the spindle at a speed of 4000 RPM, the air drawing action of the turbine wheels is very pronounced and the cooling action is equally pronounced. The cooling action decreases in response to a reduction of the rotational speed of the spindle 1, i.e., in response to a reduction of the RPM of the turbines 14, 21 and 24. Such regulation of the cooling action in dependency on changes of the RPM of the spindle 1 is particularly beneficial to the bearings 4, 4, 20 and 23 which would be likely to be strongly affected by overheating when the spindle is rotated at or close to a speed of 4000 RPM. The cooling action of atmospheric air upon the bearings is automatically reduced in response to a reduction of the RPM of the spindle 1. The cooling action of atmospheric air is beneficial on the additional ground that the spindle is less likely to undergo localized thermally induced expansion which would affect the accuracy of finish of the workpieces and could cause damage to the spindle and/or to the adjacent parts of the machine. The improved cooling system ensures that the machine can finish workpieces with a high degree of accuracy irrespective of the selected rotational speed of the spindle 1, i.e., such rotational speed is not a factor which would be likely to adversely affect the quality of work which is turned out by the machine.

The distribution of turbine wheels 14, 21, 24 in the axial direction of the spindle 1 is preferably such that at least one of these turbine wheels is adjacent the bearing or bearings which are most likely to be unduly affected by overheating. As can be seen in FIG. 1, the turbine wheel 21 is adjacent the bearings 20, 23 and the turbine wheel 14 is adjacent the left-hand bearing 4.

Another important advantage of the improved method and cooling system is that the turbine wheels continuously draw fresh atmospheric air and cause spent (heated) atmospheric air to continuously leave the machine and to be admixed to atmospheric air. This ensures that atmospheric air need not be conditioned prior to entering the intakes 15 of the turbine wheel 14, the intake or intakes of the turbine wheel 21 and/or the intake 26 of the turbine wheel 24. Thus, each of these turbine wheels can draw non-conditioned atmospheric air which may but need not flow through one or more filters (such as the filter 13) prior to entering the respective turbine wheel.

A further important advantage of the improved method and cooling system is that the temperature of air streams which are induced by the turbine wheels is not too low. Thus, the temperature of air streams matches or approximates the temperature at the exterior of the machine. Such temperature is not sufficiently low to cause excessive and abrupt cooling of the spindle, bearings and certain other parts when the turbine wheels 14, 21 and 24 are driven by the pulley 6.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A method of cooling a spindle which is rotatable in a plurality of bearings in a housing of a machine, comprising the steps of:
    rotating the spindle at a plurality of speeds;
    providing a plurality of turbine wheels, each said turbine wheel being adjacent a respective bearing;
    inducing the flow of at least one cooling air stream by rotating said turbine wheels, said turbine wheels drawing air from the surrounding atmosphere;
    causing the at least one air stream to exchange heat with the spindle and with at least one bearing; and
    coupling said turbine wheels to said spindle to vary the quantity of air in the at least one stream as a function of the speed of the spindle.

2. The method of claim 1, wherein said step of causing the at least one air stream to exchange heat with the spindle and with the at least one bearing comprises conveying the at least one air stream from the atmosphere and along the spindle in at least one of two directions including a first direction substantially radially and a second direction substantially axially of the spindle.

3. A machine comprising a housing; a spindle rotatable in said housing; friction reducing means including at least one bearing interposed between said housing and said spindle; means for rotating said spindle at a plurality of different speeds; and means for cooling said spindle and said at least one bearing, including means for drawing at least one stream of air from the surrounding atmosphere at a rate which is at least substantially proportional to the speed of the spindle, and means for establishing an exchange of heat between the at least one air stream on the one hand, and the spindle and the at least one bearing on the other hand, said rotating means including a pulley having at least one passage which connects said drawing means with the atmosphere.

4. The machine of claim 3, wherein said drawing means comprises at least one air compressing turbine wheel having at least one intake for atmospheric air and at least one outlet for admission of compressed air to said establishing means.

5. The machine of claim 4, wherein said establishing means defines at least one channel for the at least one air stream.

6. The machine of claim 5, wherein said channel has an air receiving end in communication with said at least one outlet and a second end which discharges air into the atmosphere.

7. The machine of claim 5, wherein said establishing means comprises a tubular member which is installed in said housing and surrounds said spindle and said at least one bearing, said at least one channel being disposed between said tubular member and said housing.

8. The machine of claim 3, wherein said drawing means includes a rotary air compressing turbine wheel having an intake in communication with said at least one passage and at least one outlet for compressed air, said establishing means defining at least one channel which has a receiving end in communication with said at least one outlet and a second end which discharges air into the atmosphere.

9. The machine of claim 3, wherein said drawing means comprises at least one substantially bell-shaped rotary turbine wheel which receives torque from said rotating means, said at least one turbine wheel having a suction intake for atmospheric air, an outlet for compressed air and air compressing vanes between said intake and said outlet.

10. A machine comprising a housing; a spindle rotatable in said housing; friction reducing means including at least one bearing interposed between said housing and said spindle; means for rotating said spindle at a plurality of different speeds; and means for cooling said spindle and said at least one bearing, including means for drawing at least one stream of air from the surrounding atmosphere at a rate which is at least substantially proportional to the speed of the spindle, and means for establishing an exchange of heat between the at least one air stream on the one hand, and the spindle and the at least one bearing on the other hand, said establishing means including a tubular member which is installed in said housing and surrounds said spindle, said tubular member and said housing defining a chamber for reception of said at least one air stream from said drawing means, said tubular member having heat dissipating projections in said chamber, said drawing means including a rotary turbine wheel for providing said at least one stream of air.

11. The machine of claim 3, wherein said drawing means comprises a turbine wheel which is driven by said spindle, said turbine wheel comprising a substantially axially extending annular intake which draws air from the surrounding atmosphere in response to rotation of said spindle, and a plurality of substantially radially outwardly extending outlets which discharge air from said intake into the atmosphere, said turbine wheel including a portion forming part of said establishing means.

12. The machine of claim 11, wherein said spindle has a first end and a second end, said turbine wheel being connected with one of said ends.

13. The machine of claim 3, wherein said spindle is elongated, said friction reducing means including a plurality of antifriction bearings which are spaced apart from each other in the longitudinal direction of said spindle.

14. The machine of claim 13, wherein said drawing means comprises a plurality of air compressing turbine wheels at least one of which is adjacent one of said bearings and has an intake for atmospheric air and an outlet for compressed air.

15. The machine of claim 14, wherein said turbine wheels receive torque from said rotating means.

16. The machine of claim 3, wherein said housing comprises a column of a milling machine.

17. The machine of claim 3, wherein said rotating means includes means for rotating said spindle at speeds in the range of 1 to 4000 RPM.

18. A machine comprising:

a housing;

a spindle rotatable in said housing;

friction reducing means including at least one bearing interposed between said housing and said spindle;

means for rotating said spindle;

a first turbine wheel mounted coaxially for rotation with said spindle, said first turbine wheel being in heat transfer relationship with said at least one bearing, and comprising a rotating element having at least one axially directed rotating inlet and at least one rotating outlet located radially outward from said inlet, and a respective flow passage between said at least one inlet and said at least one outlet, rotation of said first turbine wheel drawing a flow of air into said inlet, through said flow passage and out from said first turbine wheel outlet, said flow of air cooling said first turbine wheel and thereby said at least one bearing.

19. A machine as in claim 18, further comprising a tubular member installed in said housing and surrounding said spindle and said at least one bearing, said tubular member and said housing forming a channel therebetween;

a second turbine wheel having an intake for atmospheric air and an outlet for said air at increased pressure, said air from said second turbine wheel passing through said channel between said tubular member and said spindle and said at least one bearing to remove heat from said spindle and bearing.

20. A machine comprising a housing; a spindle rotatable in said housing; friction reducing means including at least two bearings spaced apart and interposed between said housing and said spindle; means for rotating said spindle; and means for cooling said spindle and said at least two bearings; a plurality of turbine wheels for drawing air from the surrounding atmosphere, and means for establishing heat exchange between the drawn air and the spindle and the at least two bearings, each said turbine wheel being located adjacent a respective one of said bearings.

* * * * *